United States Patent [19]

Halvorsen et al.

[11] Patent Number: 4,742,685
[45] Date of Patent: May 10, 1988

[54] FUEL DISTRIBUTING AND METERING ASSEMBLY

[75] Inventors: Robert M. Halvorsen, Birmingham; Jerome R. Bradley, Sterling Heights; Gregory F. Long, Canton, all of Mich.

[73] Assignee: Ex-Cell-O Corporation, Troy, Mich.

[21] Appl. No.: 926,492

[22] Filed: Nov. 4, 1986

[51] Int. Cl.$^4$ ............................................. F02C 1/00
[52] U.S. Cl. .................................. 60/739; 60/746; 123/455
[58] Field of Search .................. 123/452, 455, 462; 60/746, 747, 739; 239/581.1

[56] References Cited

U.S. PATENT DOCUMENTS

| | | |
|---|---|---|
| 1,033,015 | 7/1912 | Holzwarth . |
| 2,508,420 | 5/1950 | Redding ............................ 60/746 |
| 2,806,519 | 9/1957 | Basford . |
| 2,993,338 | 7/1961 | Wilsted . |
| 3,335,567 | 8/1967 | Hemsworth . |
| 3,516,252 | 6/1970 | Udell . |
| 3,625,252 | 12/1971 | Bermel . |
| 3,698,186 | 10/1972 | Beane . |
| 3,793,838 | 2/1974 | Nash . |
| 3,949,775 | 4/1976 | Cornell . |
| 4,305,255 | 12/1981 | Davies ................................ 60/746 |
| 4,312,185 | 1/1982 | Nash . |

Primary Examiner—Douglas Hart
Attorney, Agent, or Firm—Edward J. Timmer

[57] ABSTRACT

The fuel distributing and metering assembly provides separate multiple metered fuel flows from a common fuel reservoir by including a rotary valve having multiple valve metering slots for generating separate multiple fuel flows, a valve seat having multiple seat orifices relative to which the valve metering slots are moved for metering the multiple fuel flows, and multiple fuel discharge paths for conducting multiple fuel flows to each of a plurality of fuel injection devices. Each fuel discharge path to each fuel injection device includes multiple upstream transversely spaced discharge passages and multiple downstream discharge passages nested longitudinally one inside the other with the inner downstream discharge passage aligned beneath its associated upstream discharge passage and another downstream discharge passage therearound being transversely displaced relative to its associated upstream discharge passage. A transverse discharge passage is provided inter-connecting each transversely displaced outer downstream discharge passage with its associated upstream discharge passage. Separately metered primary and secondary fuel flows can be thereby provided to each of a plurality of fuel injection devices, such as nozzles, spraybars and the like, connected to the assembly.

20 Claims, 4 Drawing Sheets

FLOW (PPH) VS
ROTARY POSITION (DEG.)

FUEL DISTRIBUTING AND METERING ASSEMBLY

FIELD OF THE INVENTION

The present invention relates to fuel distributing and metering valve assemblies for providing a plurality of separate metered fuel streams from a common fuel flow.

BACKGROUND OF THE INVENTION

U.S. Pat. No. 2,993,338 issued July 25, 1961 to H. D. Wilsted discloses a fuel spray bar assembly which supplies fuel from an annular fuel manifold extending around the outside of the engine casing and having radially extending tubular spray bars receiving fuel from the manifold.

Co-pending U.S. application Ser. No. 608,760 pending entitled "Mechanically Operated Fuel Control System", filed in the name of Raymond J. Rulis, et al and of common assignee herewith, discloses a fuel staging and distribution system having a plurality of staging valve assemblies actuated mechanically by a common synchronizing ring to distribute and stage fuel flow to each of a plurality of spray bars or bundles of spray bars or fuel nozzles in a gas turbine engine.

U.S. Pat. No. 2,806,519 issued Sept. 17, 1957 to K. A. Basford, et al discloses a fuel control system for an internal combustion engine with means for compensating for an engine operating variable. The system includes a piston/cylinder actuator which varies the extent of eccentric rotation of a spring biased plate valve relative to multiple fuel passages.

U.S. Pat. No. 3,625,252 issued Dec. 7, 1971 to T. W. Bermel provides a linearly variable fluidic resistor which includes a rotatable valve, multiple resistive paths between first and second fluid chambers, and separate single flow external output connections for the chambers.

SUMMARY OF THE INVENTION

The present invention contemplates a fuel distributing and metering valve assembly that includes a movable valve in a chamber receiving fuel from a source with the valve having multiple valve orifices or openings such as metering slots spaced apart transversely thereon for generating multiple fuel flows from the fuel in the chamber and a valve seat having multiple seat orifices or openings spaced transversely apart and relative to which the valve orifices are moved by movement of the valve to meter each of the multiple fuel flows independently of one another.

A fuel discharge path is provided from the valve assembly to a fuel nozzle, fuel spray bar, or other fuel injection device requiring separate multiple fuel flows thereto for discharge as separate multiple fuel flows into a gas turbine engine combustor, afterburner and the like.

The fuel discharge path to each such fuel injection device includes multiple upstream fuel discharge passages transversely spaced apart with each passage receiving a respective one of the metered fuel flows from a respective seat orifice and further includes multiple downstream fuel discharge passages nested longitudinally one inside the other to conduct one fuel flow inside another. The nested downstream fuel discharge passages are transversely displaced relative one or more of the upstream discharge passages and in a preferred embodiment are substantially in line relative to one of the upstream discharge passages.

The valve assembly includes a transverse fuel discharge passage inter-connecting each of the upstream discharge passages to the respective associated transversely displaced downstream nested discharge passages.

In a preferred embodiment of the invention, the innermost downstream discharge passage is substantially coaxial with its associated upstream discharge passage and includes an upstream open end to receive fuel directly from the upstream discharge passage whereas the other downstream discharge passage nested around the innermost downstream discharge passage includes an upstream end which located downstream of the open end of the innermost passage and is inter-connected by a downstream transverse discharge passage to its associated upstream discharge passage, which is transversely displaced relative thereto.

In another preferred embodiment of the invention, the fuel valve assembly includes a pair of fuel nozzles on a support strut, each requiring a primary (low) flow and secondary (high) flow fuel stream. The valve assembly includes a valve member with two pairs of primary and secondary orifices and a valve seat member with two pairs of primary and secondary orifices for generating two sets of metered primary and secondary fuel flows from a common source of fuel in the chamber for discharge of one set to each nozzle. The fuel discharge path for each of the fuel nozzles includes primary and secondary upstream discharge passages transversely spaced apart and longitudinally nested primary and secondary downstream discharge passages with the secondary discharge passage being outside or around the primary discharge passage and displaced transversely from its associated upstream secondary discharge passage and inter-connected therewith by a transverse discharge passage. The innermost primary downstream discharge passage is coaxially aligned beneath the associated primary upstream discharge passage to receive fuel therefrom, the fuel receiving end of the primary downstream discharge passage being upstream relative to the fuel receiving end of the secondary downstream passage receiving fuel from the transverse passage.

In an even more preferred embodiment of the invention, the multiple upstream and downstream fuel discharge passages are provided in inserts positioned successively beneath the valve seat and the nested downstream discharge passages are formed by hollow tubes positioned one within the other with the inner tube extending upstream farther than those therearound.

BEST MODE FOR CARRYING OUT THE INVENTION

Figure 10:
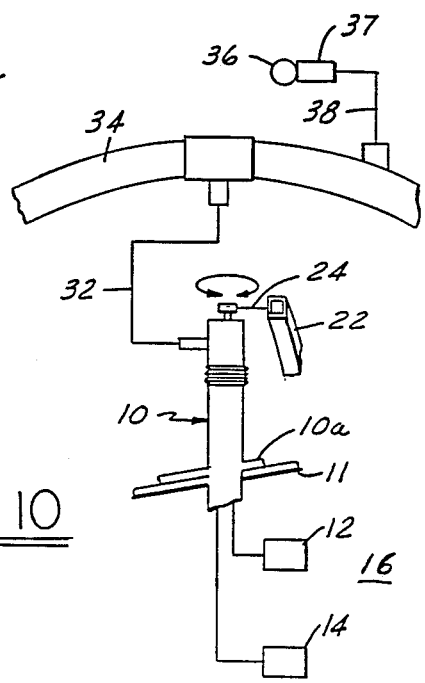
FIG. 10 is a schematic illustration of a fuel control system employing the fuel distributing and metering assembly of the above figure.

With reference to FIG. 10, a fuel supply system for a gas turbine engine is shown including a fuel distributing and metering assembly 10 having fuel injector nozzles 12, 14 disposed within the combustor 16 of a gas turbine engine. The assembly 10 includes a flange 10a mounted on the combustor or other casing 11 of the engine as is known. The pilot nozzle 12 supplies relatively low fuel flow for low engine power operation while the main nozzle 14 supplies relatively high fuel flow for high engine power operation. As will become apparent hereinafter, the pilot nozzle operates initially when the assembly 10 is actuated by synchronizing ring 22 and the main nozzle 14 subsequently operates in conjunction with the pilot nozzle to provide additional fuel flows to the combustor.

Although not shown, those skilled in the art will appreciate that a plurality of assemblies 10 are disposed circumferentially around the combustor and each assembly includes an actuated arm 24 connected to synchronizing ring 22 so that all of the assemblies are actuated in unison by the ring as controlled by a suitable electrohydraulic servo control (not shown) which forms no part of this invention.

Each fuel distributing and metering assembly 10 has a single fuel inlet 26 connected by a fuel conduit 32 to a single common fuel manifold 34 supplied fuel under pressure by pump 36 and valve 37 through conduit 38.

Figure 2:
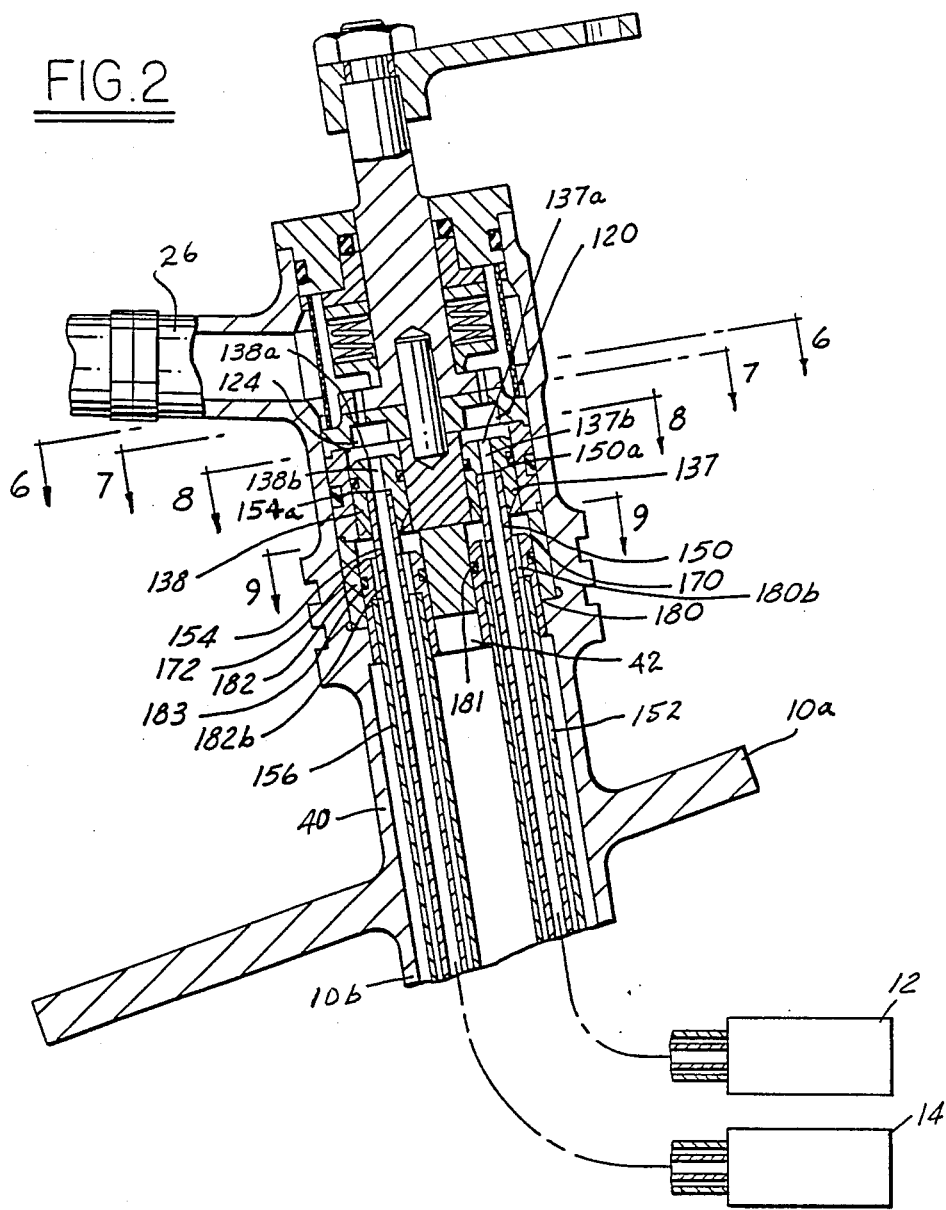
FIG. 2 is a longitudinal cross-sectional view along line 2—2 of the assembly of FIG. 1.

With respect to the fuel distributing and metering assembly of the invention, reference is made initially to FIG. 2 where it can be seen each assembly 10 includes an elongate valve body 40 having the flange 10a and inlet fitting 26 integrally thereon as shown. Inside the valve body 10 is an longitudinal cylindrical chamber 42 which houses the internal valve components as now described.

Extending through a top cap 44 sealed to the end of the valve body by o-ring 46 is a rotary valve 50 having a valve plate 52 and longitudinally extending shaft 54 rotatable about longitudinal axis A through the chamber 42. It is apparent the upper end of the shaft 54 extends outside the cap 44 and is connected to actuated arm 24 for rotation of the shaft 54 by movement of the synchronizing ring which is imparted to the shaft by actuated arm 24.

An o-ring seal 60 is disposed around the shaft 54 between cap 44 and bushing 62 to prevent fuel leakage therepast. The lower end of shaft 54 is guideably mounted on pin 64 also coaxial with axis A for rotation relative thereto. Between the lower and upper ends of the shaft 54 is a spring 66. Spring 66 bears upwardly against annular fixed plate 68 and downwardly against fixed annular collar 70 so as to bias the valve plate 52 downwardly against the valve seat 72 to effect positive metal-to-metal sealing.

As shown, the upper portion 42a of longitudinal chamber 42 receives fuel from inlet fitting 26. A cylindrical tubular fuel filter 74 is disposed in upper chamber 42a concentric with the longitudinal axis A to filter debris and foreign matter from the fuel prior to its entering chamber 42a.

Valve seat 72 is carried downstream of valve plate 52 on a first cylindrical disc insert 76 and first insert is carried in turn on second cylindrical disc insert 78 in chamber 42. Pin 64 is received in bore 65 in the first insert. As shown, the second insert 78 is supported axially or longitudinally on annual inner shoulder 80 of the valve body. The first insert 76 includes a depending annular flange 82 received in annular recess of the second insert. The first insert also includes a circumferential groove 84 in which an o-ring seal 86 is disposed to seal against fuel leakage between the circumference of the first insert and the wall defining cylindrical chamber 42.

Mounted upstream atop the first insert 76 is the cylindrical disc shaped valve seat 72. The valve seat includes a depending outer annular flange received in recess 92 in the first insert. As shown, the valve seat 72 is stationary in the chamber while the rotary valve 50 is rotatable relative thereto.

The valve plate 52 of rotary valve 50 includes a primary pilot orifice 100, secondary pilot orifice 102, primary main orifice 104 and secondary main orifice 106 (see FIG. 4) extending through the longitudinal or axial thickness; i.e., from one side (outer upstream side in communication with fuel reservoir chamber 42a) of the valve plate to the other side (inner downstream side) in positive sealing contact with the inner side of the valve seat so that fuel flows through these orifices to generate four fuel flow streams, two fuel streams (primary and secondary) for each nozzle 12, 14. In effect, the valve orifices 100-106 generate four fuel flow streams from the fuel in chamber or reservoir 42a.

Figure 1:
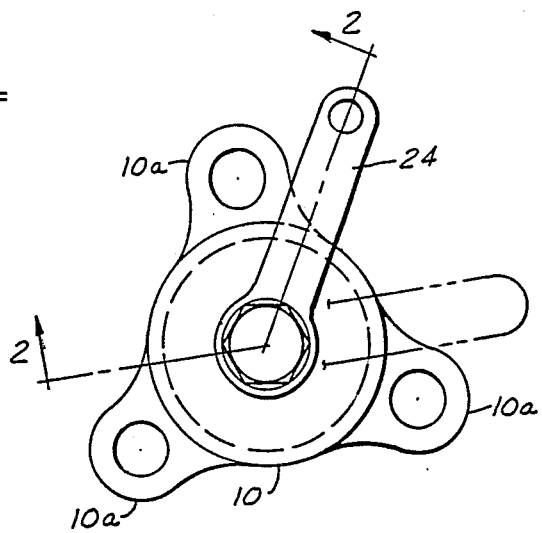
FIG. 1 is a plan view of the fuel distributing and metering assembly of the invention.
Figure 4:
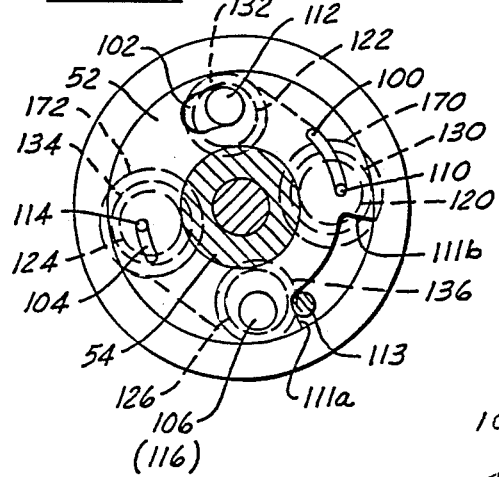
FIG. 4 is a plan view of the rotary valve in the open position.
Figure 5:
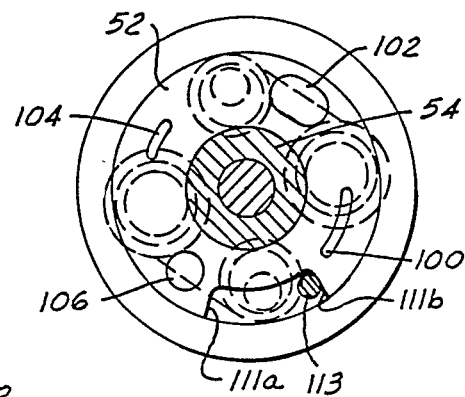
FIG. 5 is a plan view of the rotary valve in the closed position.

The valve plate 52 also includes a groove 111 partially around the circumference to receive a stop pin 113 projecting upwardly from the valve seat 72 to control the maximum rotary motion of the valve 50. For example, FIG. 4 shows the valve full open position as will be explained with upstanding stop pin 113 abutted against radial shoulder 111a of groove 111 and FIG. 5 shows the valve full closed position with stop pin 113 abutted against radial shoulder 111b. In this way, the rotary stroke of valve 50 is controlled.

Figure 6:
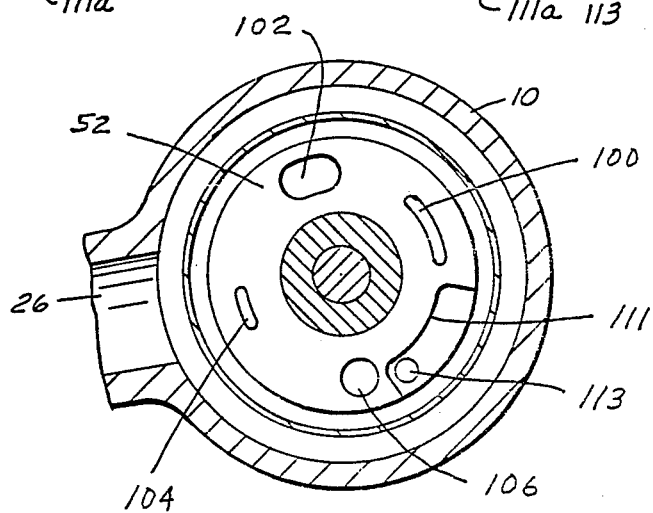
FIG. 6 is a section taken along line 6—6 of FIG. 2.

As shown best in FIG. 6, the valve orifices 100-106 have different configurations to control fuel flow rate differently for each nozzle 12, 14 and for each of the primary and secondary fuel flow rates to each nozzle 12, 14. The orifices are angularly and transversely spaced apart about the same circle from axis A. The primary pilot orifice 100 and primary main orifice 104 are arcuate narrow slots while the secondary pilot orifice 102 is a wider arcuate slot and the secondary main orifice 106 is a cylindrical bore. Of course, as those skilled in the art will appreciate, the length, width and location of the orifices 100-106 can be varied to provide different fuel flows.

The valve seat 72 includes four orifices 110, 112, 114 and 116 in its inner side mating with the inner side of the valve plate 52 and relative to which the valve orifices 100-106 are moved by rotation of valve 50 to meter the four fuel flow streams as the orifices 100-106 move. The valve seat orifices 110-116 are shown alone best in FIG. 7 and relative to valve orifices 100-106 in FIGS. 4 and 5.

Figure 7:
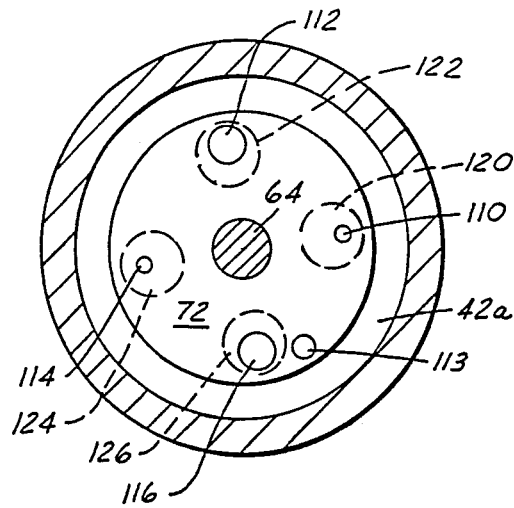
FIG. 7 is a section taken along line 7—7 of FIG. 2.

The seat orifices 110-116 extend through the longitudinal thickness of the valve seat 72 into respective larger cylindrical discharge bores 120, 122, 124, 126 angularly and transversely spaced on the outer or downstream side thereof, see FIGS. 2 and 7 beneath the respective seat orifice.

When the valve 50 is in the closed position of FIG. 5, no fuel flow passes through any of the valve orifices 100-106 or seat orifices 110-116. In full open position of FIG. 4, the primary pilot fuel flow passes through valve orifice 100, seat orifice 110 and into discharge bore 120 in the valve seat. Secondary fuel flow passes through valve orifice 102, seat orifice 112 and into discharge bore 122. Primary main fuel flow passes through valve orifice 104, seat orifice 114 and into discharge bore 124. Secondary main fuel flow passes through valve orifice 106, seat orifice 116 and into discharge bore 126.

Referring to FIG. 5 which shows the valve closed position, it is clear that counterclockwise rotation of the rotary valve 50 will cause the primary pilot orifice 100 to gradually register with primary seat orifice 110 before any of the other orifices are registered to provide metered primary fuel to pilot nozzle 12 first. Following flow of the primary pilot fuel flow past orifices 100, 110 and thereupon further rotation of the valve, the secondary pilot orifice 102 will gradually register with primary seat orifice 112 to provide metered secondary fuel to pilot nozzle 12 in addition to the primary fuel flow.

Upon slightly further counterclockwise rotation of the valve, the primary main orifice 104 will gradually register with primary main seat orifice 114 to provide metered primary fuel flow to main nozzle 14. Still further rotation of the valve in that direction will gradually register secondary main orifice 106 with secondary main seat orifice 116 to provide metered secondary fuel flow in addition to primary fuel flow to main nozzle 14 while pilot nozzle 12 still receives its primary and secondary fuel flows.

Those skilled in the art will understand that the four fuel flows are metered to a maximum flow rate as the valve orifices 100-106 gradually register with and gradually expose seat orifices 110-116 to the fuel flow through the valve orifices until maximum flow rate is achieved for each fuel flow at the valve open position of FIG. 4.

Figure 11:
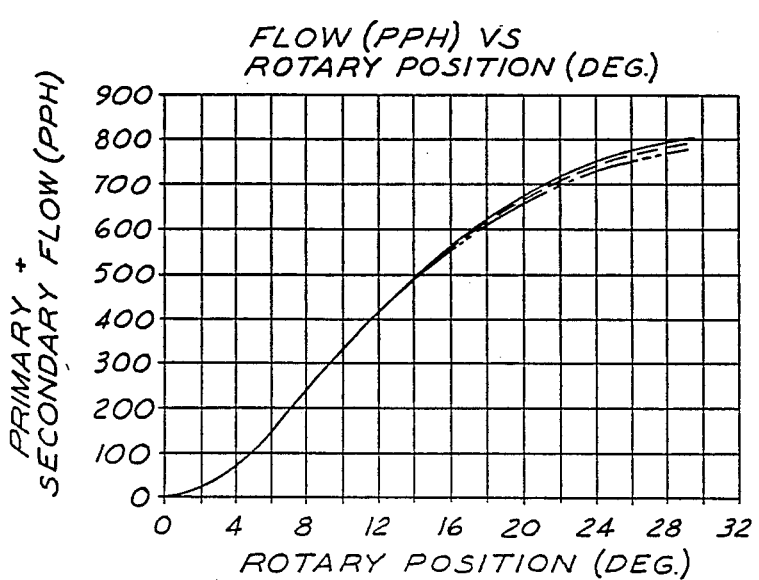
FIG. 11 is a graph of fuel flow versus rotary valve position for the assembly.

The fuel flow curve versus rotary position of the valve 50 for the orifices shown in the Figures is illustrated in FIG. 11.

Figure 8:
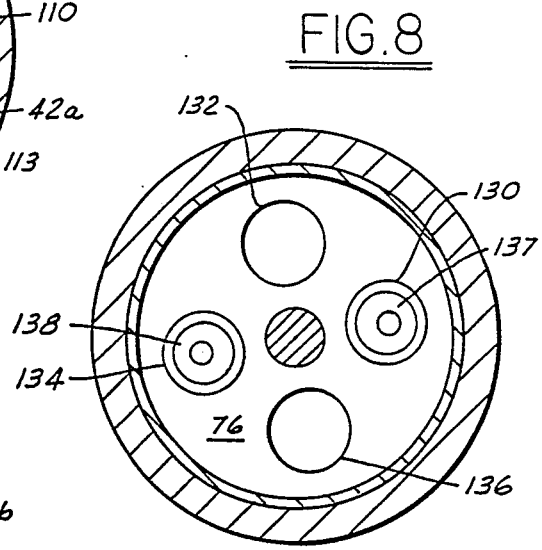
FIG. 8 is a section taken along line 8—8 of FIG. 2.

As mentioned, downstream discharge bores 120-126 are aligned beneath their respective seat orifices 110-116 to receive fuel flow therefrom, FIG. 7. Aligned beneath discharge bores 120-126 in an angularly and transversely spaced array are cylindrical angular spaced discharge bores 130, 132, 134, 136 in the first insert, e.g. See FIGS. 2, 4 and 8. First insert 76 includes cylindrical plugs 137 and 138 in the respective primary pilot and primary main discharge bores 130 and 134. Each plug 137, 138 has an open upper end 137a, 138a to receive primary pilot and primary main fuel flow from the respective discharge plug 137, 138 to pass through longitudinal cylindrical discharge passages 137b, 138b in the plugs. Passages 137b, 138b in turn communicate with the open upper ends 150a, 154a of primary fuel discharge tubes 150, 154 received in larger diameter counterbores in the downstream side of each plug as shown in FIGS. 2 and 8. Each plug 137, 138 includes an o-ring seal around its circumference for preventing fuel leakage therepast.

Figure 3:
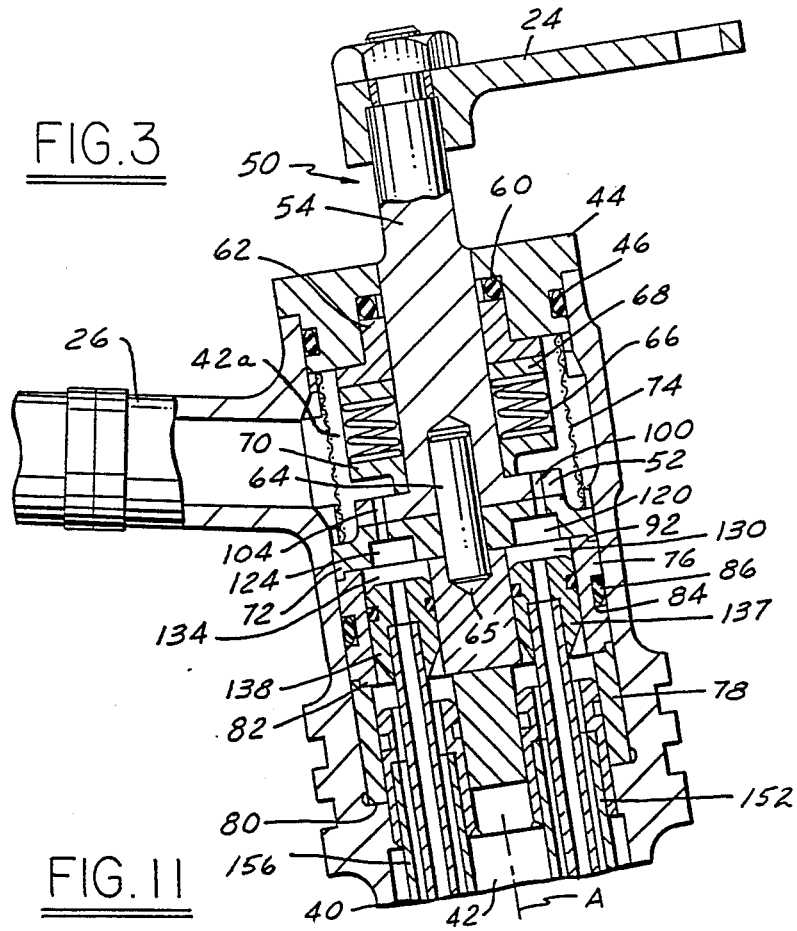
FIG. 3 is an enlarged longitudinal cross-sectional view of FIG. 2.

As shown best in FIG. 3, the downstream end of each plug 137, 138 is tapered conically inwardly and the fuel tubes 150, 154 are brazed or welded to the respective downstream end.

The secondary pilot and main fuel discharge bores 132, 136 extend through the axial thickness of the first insert 76 to the downstream side thereof without any plugs therein, FIG. 8.

As will be explained later, primary pilot and primary main fuel flow through the inner downstream discharge passages in tubes 150, 154, respectively, flows through the inner tube passages in strut portion 10b of the valve body to the pilot and main nozzles 12, 14 for discharge into the combustor.

Figure 9:
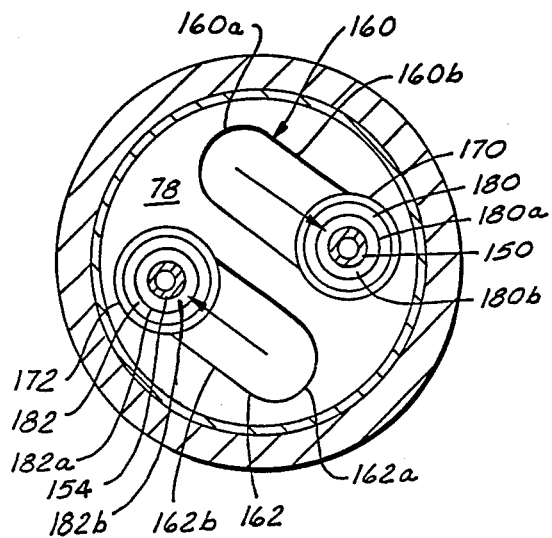
FIG. 9 is a section taken along line 9—9 of FIG. 2.

On the other hand, secondary pilot and main fuel flow discharges from discharge bores 132, 136 in the first insert 76 into transverse discharge slots 160, 162 in the upstream side of the second insert 78, see FIG. 9. Transverse slots 160, 162 are machined into the upstream side of insert 78 and include a radially defined portion 160a, 162a whose center axis is substantially coaxial with that of the respective discharge bore 132, 136 in the upstream first insert 76. The slots 160, 162 also include a straight sided rectilinear portion 160b, 162b extending transversely from the radial portion to downstream discharge bores 170, 172 in the upstream side of the second insert through which tubes 150, 152 extend as shown coaxial therewith.

Disposed in each downstream discharge bore 170, 172, are plugs 180, 182, respectively, through which tubes 150, 154 also extend. The plugs 180, 182 are disposed downstream or below the upstream side to a selected depth or transverse plane generally the same or co-planar as the selected depth or plane as the bottom of transverse slots 160, 162. The plugs 180, 182 include longitudinal cylindrical passages 180a, 182a through which the nested tubes 150, 154 extend and which define outer annular secondary pilot and main fuel downstream discharge passages 180b, 182b around tubes 150, 154, respectively to receive the respective secondary pilot or main fuel flow through transverse slots 160, 162.

Each plug 180, 182 includes a larger diameter counterbore in the downstream end thereof receiving the open upstream end of the respective secondary pilot and main fuel tubes 152, 156 as shown. The secondary fuel flowing through outer annular passages 180b, 182b is received in the respective tube 152, 156 and flows through the tubes in the outer annular downstream discharge fuel passages around fuel in tubes 150, 154 through strut portion 10b to the respective pilot or main nozzle 12, 14.

As shown best in FIGS. 2 and 9, the downstream discharge passage 180b and tube 150 for primary and secondary pilot fuel for pilot nozzle 12 are nested longitudinally one inside the other and are in communication with longitudinally nested tubes 150, 152. Similarly, downstream discharge passage 182b and tube 154 for primary and secondary main fuel for main nozzle 14 are nested longitudinally one inside the other and are in communication with longitudinally nested tubes 154, 156. Nesting of the primary and secondary pilot discharge passages and primary and secondary main discharge passages longitudinally one inside the other thus begins at a transverse plane generally coincident with the upstream end of plugs 180, 182.

Each plug 180, 182 includes a circumferential o-ring 181, 183 for fuel sealing purposes.

As shown in FIG. 2, longitudinally nested tubes 150, 152 and 154, 156 extend through strut portion 10b to respective fuel nozzles 12, 14 which may be of known construction for injecting pilot and main fuel into the combustor.

While the fuel distributing and metering valve assembly of the invention has been described by a detailed description of certain specific and preferred embodiments, it is understood that various modifications and changes can be made therein within the scope of the appended claims which are intended to include equivalents of such embodiments.

We claim:

1. A fuel distributing and metering valve assembly comprising:
    (a) a valve body having a fuel inlet and an internal chamber which receives fuel from the inlet,
    (b) a movable valve disposed in the chamber and having spaced apart first and second valve orifices for generating first and second fuel flows,
    (c) a valve seat disposed in the chamber and having spaced apart first and second seat orifices relative to which the respective valve orifices are moved by movement of the valve to meter the first and second fuel flows,
    (d) first and second fuel discharge paths in the chamber downstream of the valve seat for receiving and discharging the respective first and second metered fuel flows including first and second upstream discharge passages spaced apart for receiving the respective first and second metered fuel flows from the respective seat orifices and first and second downstream discharge passages nested longitudinally one within the other and displaced transversely relative to at least one of said first and second upstream discharge passages and including a discharge passage transversely interconnecting said at least one of said first and second upstream discharge passages with the respective one of the first and second downstream discharge passages displaced transversely therefrom, and
    (e) means for moving the valve relative to the valve seat.

2. The assembly of claim 1 wherein the longitudinally nested first and second downstream discharge passages are in general alignment downstream of the other of said first and second upstream discharge passages.

3. The assembly of claim 2 wherein the longitudinally nested first and second downstream discharge passages are substantially coaxial with the other of said first and second upstream discharge passages.

4. The assembly of claim 2 wherein the longitudinally nested first and second downstream discharge passages are in general alignment with the respective one of the first and second upstream discharge passages conducting fuel to the inner one of the first and second downstream discharge passages.

5. The assembly of claim 1 wherein the inner one of the longitudinally nested first and second downstream discharge passages includes an open end upstream of the open end of the outer one thereof.

6. The assembly of claim 5 wherein the transverse discharge passage extends transversely between said at least one of said first and second upstream discharge passages and said outer one of said first and second downstream discharge passages.

7. The assembly of claim 6 wherein the transverse discharge passage is generally co-planar with the upstream open end of the outer one of said first and second downstream discharge passages so as to convey fuel thereto.

8. The assembly of claim 1 wherein the first and second upstream discharge passages are formed in a first insert downstream of the valve seat and the longitudinally nested first and second downstream discharge passages are formed in a second insert downstream of the first insert with the transverse discharge passage being between the first and second insert.

9. The assembly of claim 8 wherein the transverse discharge passage is formed in the upstream side of the second insert facing the downstream side of the first insert.

10. The assembly of claim 8 wherein the first and second upstream discharge passages and first and second downstream discharge passages extend longitudinally relative to the chamber.

11. The assembly of claim 8 wherein the first and second downstream passages extend downstream from the second insert as longitudinally nested inner and outer tubes.

12. The assembly of claim 1 wherein two pairs of each of said first and second valve orifices, first and second seat orifices and first and second discharge paths are present.

13. The assembly of claim 1 wherein the means for moving the valve comprises a mechanical actuator.

14. The assembly of claim 13 wherein the actuator is a rotary actuator arm to rotate the valve.

15. A fuel-distributing and metering assembly comprising:
    (a) a valve body having a single upstream fuel inlet and a downstream strut portion with a fuel nozzle thereon for discharging separate primary and secondary fuel streams, said valve body having a longitudinal chamber, the upstream portion of which receives fuel from the inlet,
    (b) a rotary valve in the upstream portion and having angularly and transversely spaced primary and secondary valve orifices for generating separate primary and secondary fuel flows for the nozzle,
    (c) a valve seat downstream of the rotary valve in the chamber and having angularly and transversely spaced primary and secondary seat orifices relative to which the respective primary and secondary valve orifices are angularly displaced by rotary movement of the valve to meter each of the separate primary and secondary fuel flows,
    (d) a first insert downstream of the valve seat in the chamber and having angularly and transversely spaced primary and secondary longitudinal fuel discharge passages aligned with the respective primary and secondary seat orifices for receiving the respective metered primary and secondary fuel flows,
    (e) a second insert downstream of the first insert in the chamber and having longitudinally nested inner primary and outer secondary fuel discharge passages aligned with the primary fuel discharge passage of the first insert and transversely displaced from the secondary fuel discharge passage of the first insert and further having a transverse discharge passage extending from a portion thereof aligned downstream relative to the secondary fuel discharge passage in the first insert to the outer secondary fuel passage of the second insert to conduct secondary fuel thereto, said inner fuel discharge passage extending upstream to receive fuel from the primary fuel discharge passage of the first insert and said outer secondary fuel passage receiving secondary fuel downstream therefrom from the transverse passage in the second insert, and (f) means for rotating the rotary valve.

16. The assembly of claim 15 wherein the inner primary fuel passage of the second insert comprises an inner tube and the outer secondary fuel passage comprises an annular passage formed by an outer tube concentrically disposed around and spaced from the inner tube.

17. The assembly of claim 16 wherein the inner tube extends upstream to the first insert and includes an open upstream end received in a plug member therein forming the longitudinal primary fuel passage therein.

18. The assembly of claim 16 wherein the inner and outer tubes extend in nested relation downstream of the second insert through the strut portion to the nozzle.

19. The assembly of claim 16 wherein the outer tube includes an open upstream end in the second insert received in a plug member therein forming an annular outer secondary fuel passage around the inner tube.

20. The assembly of claim 15 further including a second fuel nozzle on the strut portion for discharging separate primary and secondary fuel flows and wherein the rotary valve includes an additional second set of said primary and secondary valve orifices, the valve seat includes a second set of said primary and secondary seat orificies, the first insert includes a second set of said primary and secondary longitudinal fuel discharge passages and said second insert includes a second set of said primary and secondary fuel discharge passages and a second transverse discharge passage, with the second set functioning to provide the second nozzle with separate metered primary and secondary fuel flows.

* * * * *